US008626882B2

(12) United States Patent
Jiang

(10) Patent No.: US 8,626,882 B2
(45) Date of Patent: Jan. 7, 2014

(54) RECONFIGURABLE COMMUNICATION FOR DISTRIBUTED EMBEDDED SYSTEMS

(75) Inventor: Shengbing Jiang, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 2625 days.

(21) Appl. No.: 11/245,531

(22) Filed: Oct. 7, 2005

(65) Prior Publication Data

US 2007/0081473 A1    Apr. 12, 2007

(51) Int. Cl.
*G06F 15/177* (2006.01)
*G06F 15/173* (2006.01)
*G06F 9/46* (2006.01)
*G05D 1/00* (2006.01)
*G06F 7/00* (2006.01)

(52) U.S. Cl.
USPC ........... 709/222; 709/220; 709/221; 709/223; 709/224; 718/100; 718/101; 718/102; 718/103; 701/1; 701/36

(58) Field of Classification Search
USPC .......... 709/220, 221, 222, 223, 224; 718/100, 718/101, 102, 103; 701/1, 33, 36
See application file for complete search history.

(56) References Cited

U.S. PATENT DOCUMENTS

| 6,553,297 | B2* | 4/2003 | Tashiro et al. | 701/48 |
| 6,665,601 | B1* | 12/2003 | Nielsen | 701/50 |
| 2002/0077007 | A1* | 6/2002 | Dagenais et al. | 440/1 |
| 2004/0128673 | A1* | 7/2004 | Fuchs et al. | 719/310 |
| 2007/0073944 | A1* | 3/2007 | Gormley | 710/72 |
| 2007/0286225 | A1* | 12/2007 | Enders et al. | 370/438 |

* cited by examiner

*Primary Examiner* — Ranodhi Serrao
*Assistant Examiner* — Farrukh Hussain
(74) *Attorney, Agent, or Firm* — John A. Miller; Miller IP Group, PLC

(57) ABSTRACT

A distributed embedded system that allows for the reconfiguration of tasks and messages. The system includes a system configuration manager and a plurality of electronic control units (ECU) each having an ECU configuration manager. Each ECU configuration manager stores the current configuration data for task scheduling and bus/network accessing/retrieving for the current schedule for that ECU. The system configuration manager includes a separate configuration data table for each ECU that can be reconfigured by programming signals sent on a system bus. The system configuration manager transmits the new configuration data from the data table on the bus to the ECU configuration manager if the scheduling of the tasks, message retrieval from the bus and message transmission on the bus changes for an ECU as a result of adding new tasks or new ECUs to the system.

20 Claims, 1 Drawing Sheet

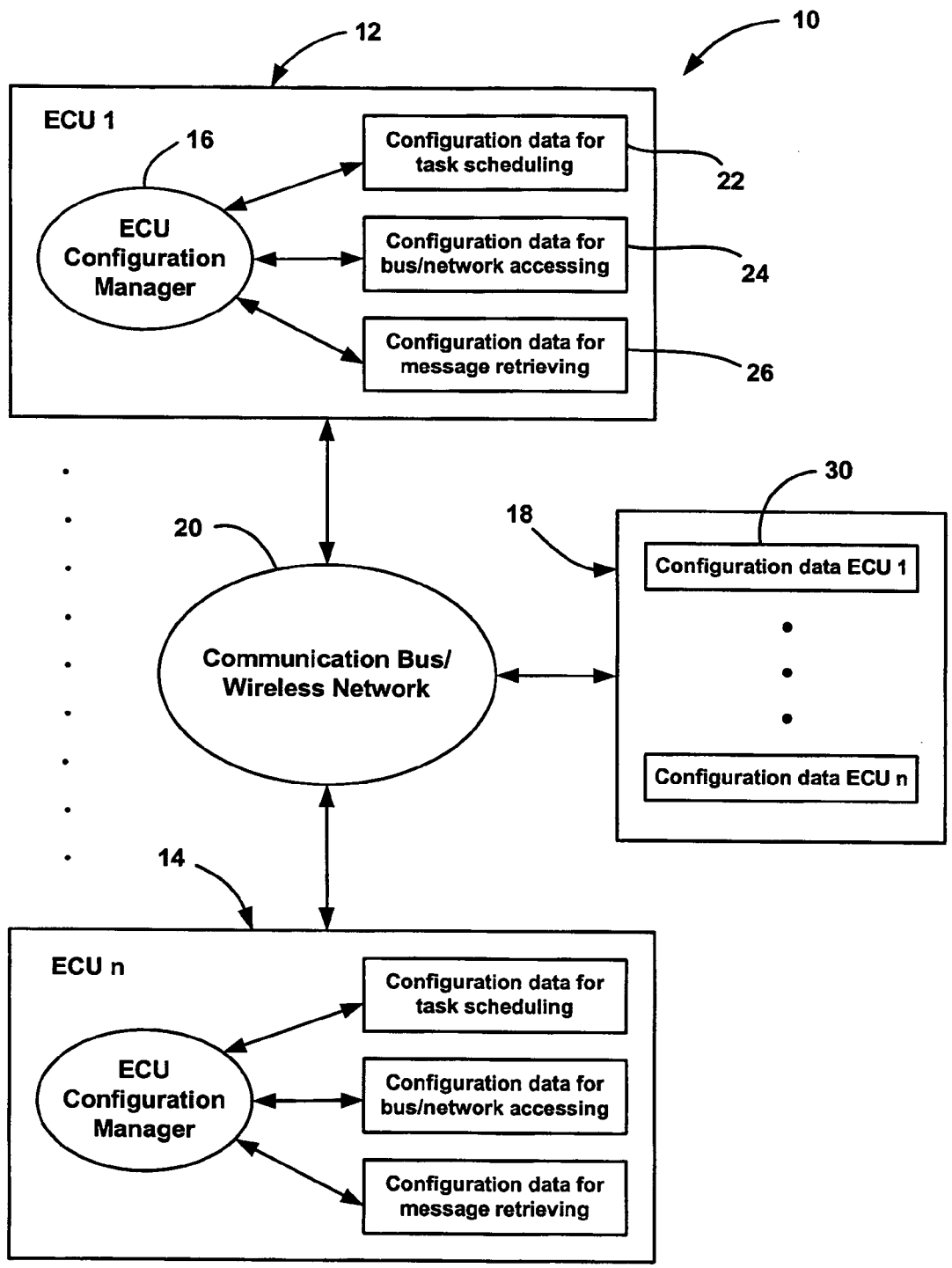

RECONFIGURABLE COMMUNICATION FOR DISTRIBUTED EMBEDDED SYSTEMS

BACKGROUND OF THE INVENTION

1. Field of the Invention

This invention relates generally to a distributed embedded system that provides extensible task and message scheduling and, more particularly, to a distributed embedded system that provides extensible task and message scheduling, where the system includes a system configuration manager and a plurality of electronic control units each having a configuration manager.

2. Discussion of the Related Art

Distributed embedded systems typically include a group of processors, referred to as electrical control units (ECU), that are coupled to each other by a communication bus/network, such as a controller area network (CAN) bus, a time-triggered protocol (TTP) bus, a FlexRay bus, a wireless network, etc. A set of tasks are allocated to each ECU, such as actuating an actuator, and messages are transmitted between the ECUs on the bus/network. For a time-triggered bus, only one message is transmitted on the bus at a time. When the system is designed, the execution of the tasks must be scheduled for each ECU and the transmission of the messages must be scheduled on the bus/network. The scheduling of the messages may have different forms, including task priority assignments for priority-based task scheduling, message identifier assignments for message scheduling on CAN buses, time slot assignments for task and message scheduling in time triggered systems, such as TTP and FlexRay, or frequency/code assignments from message scheduling in wireless networks.

The tasks are periodic and have hard deadlines that may produce catastrophic results if not met. For example, in an automotive steer-by-wire embedded system, it is necessary that the outputs from the various ECUs in the system have strict deadlines. There are also precedent constraints for the tasks where one task may need to be executed before another task is executed, possibly within a single execution period. Therefore, it is necessary that the system properly schedule the execution of the tasks in each ECU and the transmission of the task messages on the bus so that all of the deadlines are met and all of the constraints are satisfied.

Currently, once the schedules for the ECUs and the bus/network are determined, they are hard coded into the system and cannot be changed after the ECUs are built. This prevents re-using the ECUs for different systems, and also makes it impossible to reconfigure the system at run-time in response to a fault or to be adapted to different operation environments.

It is desirable that the scheduling employed in an embedded system be extensible so that if changes are needed or upgrades are developed after the initial implementation of the system, such as adding or removing ECUs and/or adding or removing tasks, the original schedule can be changed. For example, if a task set is changed for one ECU or a new ECU is added to the system, then it is desirable that this change not affect the schedules for the tasks and message transmissions of the other ECUs. If the new messages can be transmitted on the bus without affecting the transmission of the existing messages, then no change is needed for the scheduling of the other ECUs already in use. Otherwise, it may be necessary to reprogram the bus schedule at great expense.

SUMMARY OF THE INVENTION

In accordance with the teachings of the present invention, a distributed embedded system is disclosed that allows for the reconfiguration of tasks and messages. The system includes a system configuration manager and a plurality of electronic control units (ECU) each having an ECU configuration manager. Each ECU configuration manager stores the current configuration data for task scheduling and bus/network accessing for the current schedule for that ECU. The system configuration manager includes a separate configuration data table for each ECU that can be reconfigured by programming signals sent on a system bus. The system configuration manager transmits the new configuration data from the data table on the bus to the ECU configuration manager if the scheduling of the tasks, message retrieval from the bus and message transmission on the bus changes for an ECU as a result of adding new tasks or new ECUs to the system.

Additional features of the present invention will become apparent from the following description and appended claims, taken in conjunction with the accompanying drawings.

BRIEF DESCRIPTION OF THE DRAWINGS

FIG. 1 is a block diagram of a distributed embedded system that employs a method for reconfiguring ECU tasks and message scheduling, according to an embodiment of the present invention.

DETAILED DESCRIPTION OF THE EMBODIMENTS

The following discussion of the embodiments of the invention directed to a system and method for providing reconfigurable data in a distributed and embedded system is merely exemplary in nature, and is in no way intended to limit the invention or its applications or uses.

FIG. 1 is a block diagram of a distributed embedded system 10 including a plurality of ECUs 1-n, where only two ECUs 12 and 14 are shown, according to an embodiment of the present invention. As is well understood in the art, the ECUs 12 and 14 perform certain tasks, such as actuate an actuator in response to control signals transmitted as messages. Each ECU 12 and 14 includes an ECU configuration manager 16 that manages the operation of the ECU, particularly the tasks to be performed, when data is received and when data is transmitted for the particular ECU 12, 14. Further, the embedded system 10 includes a system configuration manager 18 that stores the configuration of message transmission and task performance for all of the ECUs 12 and 14. As will be discussed in detail below, when the system 10 is run, the system configuration manager 18 may send updated configuration data to each ECU configuration manager 16 depending on whether any of the tasks, task scheduling or message scheduling has changed. The ECU configuration managers 16 and the system configuration manager 18 communicate with each through the system 10 on a communications bus/network 20. The bus/wireless network 20 can be any suitable communication bus/network including, but not limited to, a CAN bus, a TTP bus, a FlexRay bus, a wireless network, etc.

After each ECU configuration manager 16 receives the configuration data from the system configuration manager 18, it updates the configuration data stored in the ECU 12, 14, where the updated configuration data will be used for the subsequent operation of the ECU 12,14. The system configuration manager 18 includes a separate configuration data table 30 for each of the ECUs 12,14. If a particular ECU 12, 14 is assigned a new task, or a new ECU is added to the system 10, then the task scheduling, message receiving from the bus 20 and message sending on the bus 20 may need to be reconfigured for one or more of the ECUs 12, 14 to handle the new task or the new ECU. When the new task or the new ECU is identified by reprogramming signals sent on the bus/wireless network 20 to the system configuration manager 18, the system configuration manager 18 will take the appropriate steps to add a table for the new ECU and update each table 30 for each separate ECU 12, 14 as required so that the new task scheduling, message sending on the bus 20 and message retrieval from the bus 20 is provided to accommodate the new task or the new ECU. The system configuration manager 18 then sends the new configuration data for the particular ECU 12, 14 on the communication bus/wireless network 20 when the system is initialized at run time. Further, if there is a fault in the operation of the system 10 where improper messages would be sent, the system configuration manager 18 can reload the scheduling for each of the ECUs 12, 14 from the tables 30.

The configuration data for each ECU 12 includes three parts. Particularly, the configuration data includes a configuration data for task scheduling table 22, a configuration data for bus/network message accessing table 24, and a configuration data for message retrieving table 26 from the bus/network 20. The task scheduling table 22 is used to schedule task execution. The task scheduling data could be in the form of priority assignments for event-triggered operating systems or in the form of time slot assignments for time-triggered operating systems. The task scheduling table 22 is included for updating because it is closely related to the message accessing table 24 and the message receiving table 26. For example, if the transmission time of a message is reconfigured at an earlier time, then the task that generates the message must finish earlier than before. Thus, the task scheduling table 22 should be changed along with the change of the message accessing table 24 and the message retrieving table 26.

The message accessing table 24 is used for scheduling messages on the bus/network 20. The message accessing table 24 has different forms for different bus/networks. For example, the message retrieving table 24 can include message identifier assignments for a CAN bus, transmission time slots for a time-triggered bus, or transmission frequency code assignments for wireless networks.

The message retrieving table 26 is used for obtaining the messages it needs from the bus/network 20. The configuration data for the message retrieving table 26 may take different forms for different buses. For example, it may be the message identifier filtering assignments for CAN buses, the receiving time slot assignments for time-triggered buses, or the frequency/code filtering assignments for wireless networks. The message retrieving table 26 is included for updating because it is closely related to the message accessing table 24. The message retrieving table 26 will be changed for the ECU 12 that receives messages with changes for the message accessing table 24.

Two requirements are necessary for the system 10 to be able to reconfigure data as discussed above. The configuration implementation for each ECU 12, 14 for the task scheduling table 22, the message accessing table 24 and the message retrieving table 26 are not hard-coded, and are based on the configuration data that is stored in each ECU 12, 14 that can be updated at run time. Further, the ECU configuration managers 16 need to have a unique ID. The ECU ID is assigned statically and will not be changed as long as the ECU 12, 14 is not rebuilt. The system configuration manager 18 will use the ECU ID to send the configuration data from the particular table 30 to the corresponding ECU configuration manager 16. The ECU configuration manager 16 will only retrieve the configuration data from the bus/network 20 that has its ECU ID in it.

The benefits that can be realized by the reconfigurable communication in distributed embedded systems discussed above include good ECU reusability, good system extensibility and the enabling of self-reconfiguration. To see how the ECUs 12, 14 are reusable across different system platforms, consider the two ECUs 12 and 14 that form one sub-system and communicate with each other over a CAN bus. In a first system platform, the ECUs 12 and 14 share the CAN bus with two other ECUs. In a second system platform, the two ECUs 12 and 14 share the CAN bus with two other ECUs. Consider the case that the message identifier assignments for the ECUs 12 and 14 in the first platform do not work in the second platform, i.e., either there is a conflict in identifier assignments, or if the same message identifier assignments are used, then some deadlines may be missed. With the present invention, the ECUs 12 and 14 can be reused from the first platform to the second platform because the message identifier assignments can be derived from the system configuration manager 18 in the initialization phase of the system, and the ECUs 12 and 14 will perform correctly with different identifier assignments in the two different platforms.

For system extensibility, consider a system that consists of a number of ECUs that are connected through a time-triggered bus. Now consider adding two more ECUs to the system 10 where the bus schedule must be changed and the transmission/slot assignments for most of the ECUs must be changed. With the present invention, there is no need to change those ECUs because the only thing that needs to be changed is the configuration data in the system configuration manager 18. The changed configuration will be communicated to each ECU configuration manager 16 at run-time in the initialization phase of the system 10. The present invention also enables the self-reconfiguration of the system 10 provided that there is an intelligent run-time configuration generator in the system 10, which could provide run-time updating of the configuration data. The system configuration manager 18 could communicate the run-time updated configuration data to the corresponding ECU configuration manager 16 for the subsequent operation of the ECU 12, 14.

Note that it has not been specifically stated how the configuration data for each ECU 12, 14 is generated for the system configuration manager 18. The configuration data could be generated off-line and stored in the system 10 for the system configuration manager 18 to use. For example, an ECU could be reused without any change from one system platform to another system platform because it receives its configuration data from the system configuration manager 18 at the initialization time of the system 10, and this configuration could remain unchanged for the whole mission time. Or, the configuration data could be generated on-line by some intelligent run-time configuration manager, as in the case of system self-configuration in the presence of failures.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A distributed embedded system comprising:
a plurality of electronic control units (ECUs), each ECU including an ECU configuration manager, a configuration data for task scheduling table, a configuration data for network accessing table and a configuration data for message retrieving table;

a system configuration manager including a plurality of configuration data tables, where one configuration data table is assigned for each ECU, wherein the configuration data tables include task scheduling and message scheduling for the ECUs; and a communications network for transmitting messages between the ECUs and the systems configuration manager, wherein the system configuration manager transmits the configuration data tables for the ECUs on the communications network to provide the configuration data for the configuration data for task scheduling table, the configuration data for network accessing table and the configuration data for message retrieving table so that the task scheduling and the message scheduling for the ECUs can be reprogrammed.

2. The system according to claim 1 wherein the communications network is selected from the group consisting of a controller area network bus, a time-triggered protocol bus, a FlexRay bus and a wireless network.

3. The system according to claim 1 wherein the system configuration manager adds a new configuration data table for the task scheduling and message scheduling for a new ECU that may be added to the system.

4. The system according to claim 1 wherein the system configuration manager transmits the configuration data table to the ECUs at an initialization phase if the task scheduling and/or message scheduling for a particular ECU has changed.

5. The system according to claim 1 wherein each ECU is assigned a unique identification number, and wherein an ECU will retrieve configuration data transmitted on the network by the system configuration manager only if it has its identification number.

6. The system according to claim 1 wherein the task scheduling is in the form selected from the group consisting of priority assignments for event-triggered operating systems and time-slot assignments for time-triggered operating systems.

7. The system according to claim 1 wherein the network is a time-triggered bus.

8. A distributed embedded system comprising:

a plurality of electronic control units (ECUs), wherein each ECU includes stored configuration data that can be reconfigured, said configuration data including task scheduling and message scheduling;

a system configuration manager storing the configuration data for each of the ECUs; and a communications network for transmitting messages between the ECUs and the system configuration manager, wherein the system configuration manager transmits the configuration data for the ECU on the communications network to reconfigure the data in the plurality of ECUs.

9. The system according to claim 8 wherein the communications network is selected from the group consisting of a controller area network bus, a time-triggered protocol bus, a FlexRay bus and a wireless network.

10. The system according to claim 8 wherein the system configuration manager stores new configuration data for the task scheduling and message scheduling for a new ECU that may be added to the system.

11. The system according to claim 8 wherein the system configuration manager transmits the configuration data to the ECUs at an initialization phase if the task scheduling and/or message scheduling for a particular ECU has changed.

12. The system according to claim 8 wherein each ECU is assigned a unique identification number, and wherein an ECU will retrieve configuration data transmitted on the network by the system configuration manager only if it has its identification number.

13. The system according to claim 8 wherein the task scheduling is in the form selected from the group consisting of priority assignments for event-triggered operating systems and time-slot assignments for time-triggered operating systems.

14. A method for scheduling messages and tasks in a distributed embedded system, said method comprising:

storing configuration data for task scheduling and message scheduling in a plurality of electronic control units (ECUs);

storing the configuration data for each ECU in a system configuration manager;

transmitting reconfiguration data on a communications network to the system configuration manager if the task scheduling and message scheduling for any of the ECUs changes; and transmitting the reconfiguration data on the communications network from the system configuration manager to the ECUs.

15. The method according to claim 14 wherein the communications network is selected from the group consisting of a controller area network bus, a time-triggered protocol bus, a FlexRay bus and a wireless network.

16. The method according to claim 14 wherein transmitting the reconfiguration data includes transmitting the reconfiguration data to the ECUs at an initialization phase if the task scheduling and/or message scheduling for a particular ECU has changed.

17. The method according to claim 14 further comprising storing configuration data for a new ECU that has been added to the system in the system configuration manager.

18. The method according to claim 14 further comprising assigning a unique identification number to each ECU, wherein transmitting the reconfiguration data to the ECUs includes including the unique identification number for the particular ECU.

19. The method according to claim 14 wherein the task scheduling is in the form selected from the group consisting of priority assignments for event-triggered operating systems and time-slot assignments for time-triggered operating systems.

20. The method according to claim 14 wherein storing configuration data for task scheduling and message scheduling includes storing a configuration data for task scheduling table, a configuration data for network accessing table and a configuration data for message retrieving table.

* * * * *